Jan. 12, 1943.  P. BARTLETT ET AL  2,308,261
FLUID PRESSURE CONTROL SYSTEM
Filed Dec. 6, 1939  2 Sheets-Sheet 2

Inventors:
Percy Bartlett,
Leonard S. Subber,
by Harry E. Dunham
Their Attorney.

Patented Jan. 12, 1943

2,308,261

UNITED STATES PATENT OFFICE 2,308,261

FLUID PRESSURE CONTROL SYSTEM

Percy Bartlett, Springfield, and Leonard S. Subber, Upper Darby, Pa., assignors to General Electric Company, a corporation of New York Application December 6, 1939, Serial No. 307,834

16 Claims. (Cl. 175—294)

Our invention relates to fluid pressure control systems, and more particularly to improved systems of this type particularly adapted for controlling the operation of fluid pressure operated electric circuit breakers.

It is an object of the invention to provide an improved valve construction and control system therefor for controlling the admission of fluid under pressure to the opposite sides of an operating piston characterized by its simplicity, reliability and extremely rapid response including trip-free operation when the operating piston is that of an electric circuit breaker.

Successful control of electric circuit breakers requires that the operating means for the breaker respond rapidly to open and close the breaker contacts in accordance with the circuit conditions and particularly to provide for rapid reversal of the contacts in the event that abnormal circuit conditions arise during closing movement of the breaker. In fluid pressure operated electric circuit breakers the time required for moving the control valves to different operative positions has been sufficient to present a serious problem and it is an object of the present invention to provide a control valve arrangement particularly adapted for controlling the operation of electric circuit breakers which reduces the time required for valve operation to a minimum.

Figure 1:
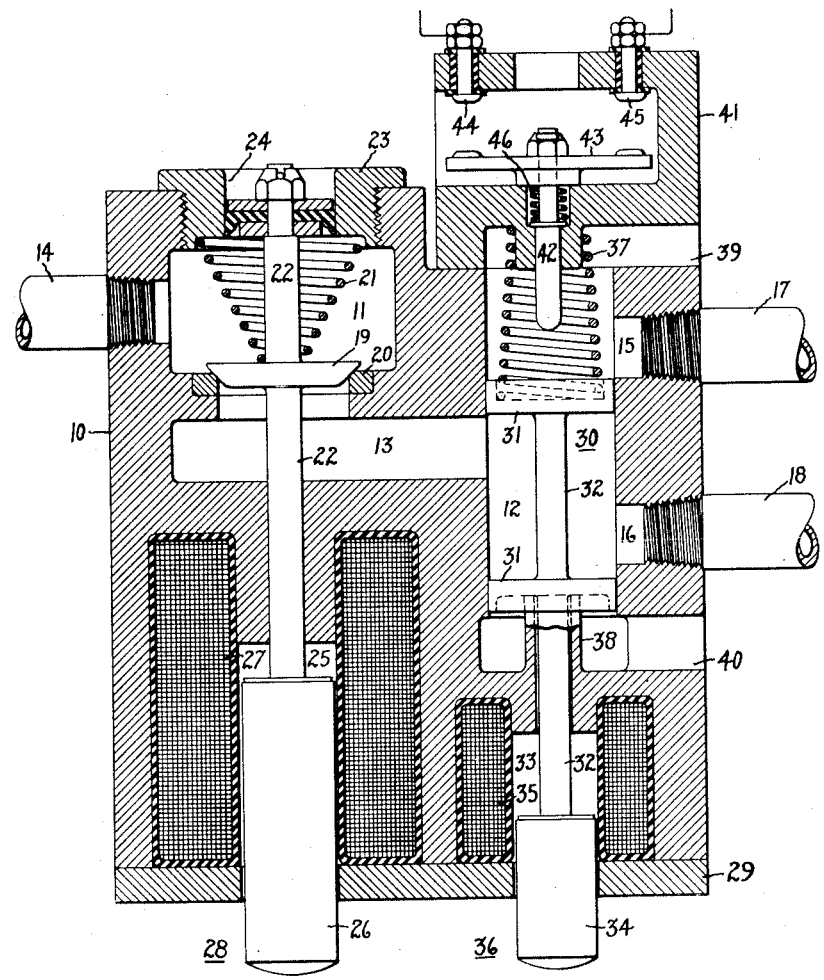
Figure 2:
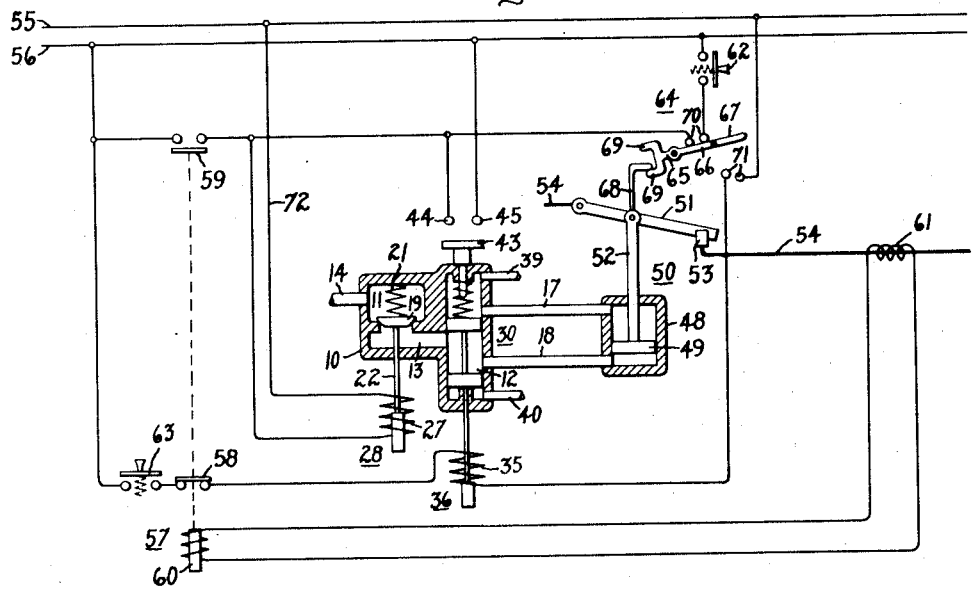
Figure 3:
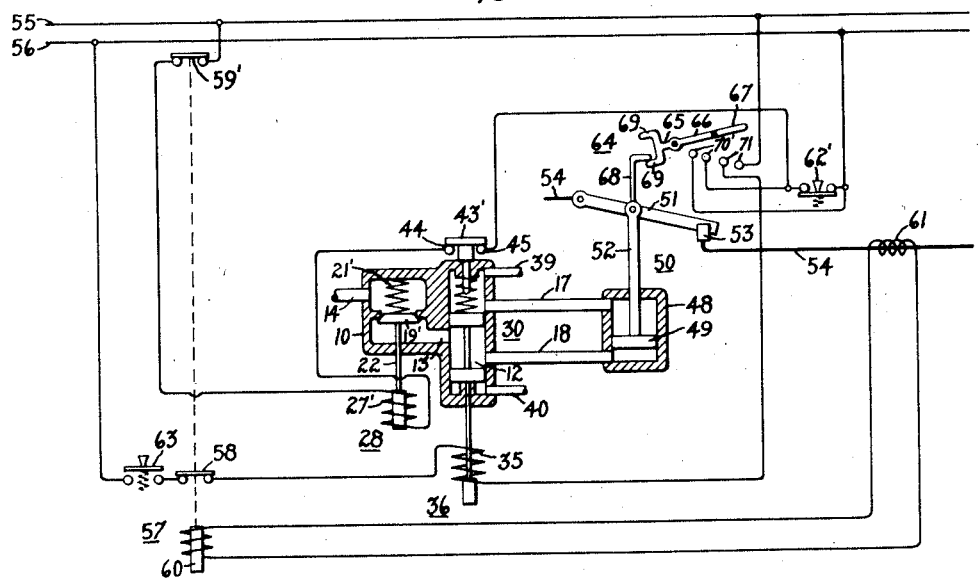

Further objects and advantages of the present invention will become apparent as the following description proceeds, reference being had to the accompanying drawings, in which Fig. 1 is an elevational view in section of a valve construction embodying the invention; Fig. 2 is a schematic diagram showing the valve incorporated in a control system for an electric circuit breaker in accordance with the invention, and Fig. 3 is a modification of the arrangement shown in Fig. 2.

Referring to Fig. 1 the improved valve construction comprises a body 10 of generally rectangular shape which may be cast from a suitable metal. The body is interiorly recessed to provide a pair of valve chambers 11 and 12 which are connected together by a passage 13. A supply conduit 14 communicating with the chamber 11 provides means for conducting fluid under pressure from a pressure tank or other source (not shown) to the interior of the valve body. The body 10 is also provided with spaced passages 15 and 16 which communicate at their inner ends with the valve chamber 12 at spaced points along its length. The passages 15 and 16 are threaded to receive conduits 17 and 18 which are provided to conduct actuating fluid to the operating piston of the device to be controlled by the valve assembly.

The flow of fluid from chamber 11 to the passage 13 is controlled by a main or power valve 19 which in the illustrated embodiment is biased to closed position against a soft seat 20 by means of a spiral spring 21. The spring surrounds the valve stem 22 and abuts the upper face of the valve 19 and the inner face of a removable bushing 23 which permits the removal of the valve member. The bushing is provided with a central opening 24 which provides a guide for the valve stem. The valve stem 22 also extends from the lower face of the valve 19 through an opening in the valve body into a recess 25. A core member 26 is secured to the lower end of the valve stem and cooperates with a coil 27 to provide an actuating solenoid 28 for the power valve. In the preferred embodiment illustrated the coil 27 is fitted within the recess 25 in the valve body 10 and held in assembled relation therewith by a plate 29 secured to the lower end of the valve body in any suitable manner.

The flow of fluid from the passage 13 to either of the conduits 17 and 18 is selectively controlled by a diverter valve 30 slidably mounted in the chamber 12. As illustrated the chamber 12 is of cylindrical form and the diverter valve comprises spaced piston members 31 connected together by a valve stem 32. The stem 32 also extends from the lower end of the valve into a recess 33 formed in the valve body 10. A core member 34 is secured to the lower end of the stem 32 and cooperates with a coil 35 to provide an operating solenoid 36 for the diverter valve. A helical spring 37 normally biases the valve 30 to its lowermost position against a stop formed by a sleeve 38. The opposite ends of the valve chamber 12 communicate with the atmosphere through passages 39 and 40. In either extreme position of the diverter valve the passage 13 communicates with the chamber 12 at a point intermediate the passages 15 and 16 and the spacing of the pistons 31 of the valve are such that the supply passage 13 is connected to one of the passages 15 and 16 while the other of these passages is vented to the atmosphere through one of the passages 39 or 40.

Means for controlling the actuating solenoid 28 of valve 19 when the coil 35 is energized to move the diverter valve from one operative position to another is provided by a switch actuated directly by the movement of the diverter valve. The valve body is provided with an extension 41 having an opening extending in axial alignment with the chamber 12 to receive a pin 42 which carries a bridging contact 43. The pin extends into the valve chamber 12 and is of such length that it is engaged by the upper piston 31 when the valve is moved to its uppermost position and the bridging contact 43 moved into engagement with the fixed contacts 44 and 45 which are mounted in insulated relation on the inner wall of the extension 41. The bridging contact 43 is slidably mounted on the pin 42 and resiliently biased to extended relationship therewith by a spring 46 in order to provide the necessary wiping engagement with the fixed contacts.

With the construction described above the operating solenoid 28 of the main valve 19 is strong enough to overcome the bias of spring 21 and the difference in pressure between the chamber 11 and passage 13. The valve is designed to be fluid tight under these operating conditions. The diverter valve 30 is of light construction and is designed to slide freely in the cylindrical valve chamber 12 under the influence of the biasing spring 37 and the operating solenoid 36. Such a construction makes it possible to connect the supply 14 to either of the passages 15 or 16, while the other of these passages is connected to the atmosphere through one of the passages 39 and 40 and to reverse rapidly these connections.

In accordance with the invention the valve construction described above is connected in the control circuit shown in Fig. 2 to provide an improved control system for fluid pressure operated circuit breakers. The system is designed to provide overload protection, trip-free closing, and manual opening and closing either directly or by remote control. In the particular embodiment shown in Fig. 2, the conduits 17 and 18 are connected to a fluid motor which may comprise a cylinder 48 in which a double acting operating piston 49 of a circuit breaker illustrated generally by numeral 50 is slidably mounted. A pivoted contact blade 51 of the breaker is connected to the piston 49 by a piston rod 52. The pivoted contact cooperates with a fixed contact 53 to control the power lines 54. It is understood that the particular construction of the breaker is not important inasmuch as the control system of the present invention is applicable to any form of fluid-operated electric circuit breaker.

The operation of the circuit breaker to open and closed positions is controlled by solenoid-operated valves 19 and 30, the operating coils of which are energized from a source of control potential, either A. C. or D. C., supplied by lines 55 and 56. In the particular embodiment illustrated the control circuit includes an overload device in the form of an electromagnetic relay 57 having normally closed contact 58 and normally open contact 59. The relay is actuated by a solenoid 60 which is energized in accordance with the current flow in the power lines 54 by means of a winding 61 inductively coupled thereto. A manual opening switch 62 and manual closing switch 63 are also provided. In order to control the energization of the operating solenoids 28 and 36 in accordance with the position of the breaker contacts, a limit switch illustrated generally by the numeral 64 is provided. The limit switch includes a pivoted contact arm 65 having insulated contact segments 66 and 67. The lever 65 is operated by an arm 68 connected to the breaker through a lost motion connection including the spaced arms 69 on the lever. The contact segments 66 and 67 cooperate with the fixed contacts 70 and 71.

Briefly, the circuit connections of the control circuit are as follows: One terminal of the operating coil 27 is connected to the supply line 55 through conductor 72. The other terminal of the coil is connected to the other supply line 56 through three parallel circuits, one of which includes the normally open manual switch 62 and the fixed contacts 70 which are bridged by the contact segments 66 of the limit switch 64 when the circuit breaker is in its closed position. The second circuit is completed to the line 56 through the normally open contact 59 of the overload device 57. The third circuit from line 55 through the coil 27 is completed to the line 56 through the normally open contacts 44 and 45 which are controlled by the bridging contact 43 in accordance with the position of the diverter valve 30. The coil 35 of the diverter valve is energized from the lines 55 and 56 through a circuit which includes in series, the fixed contacts 71 of the limit switch 64, the normally closed contact 58 of the overload device 57 and the manually operable closing switch 63.

The features of the present invention will be better understood by a consideration of the operation of the embodiment thereof just described. With the circuit breaker 50 in the closed position illustrated in Fig. 2 and with the valves in the position illustrated, the breaker may be opened by simply closing the manually operable switch 62 which completes a circuit from the supply lines 56 through the fixed contacts 70 which are bridged by segment 66 of arm 65, the coil 27 of the main valve 19 to the other supply line 55. With the coil 27 energized the main valve is opened and fluid under pressure passes from chamber 11 through passage 13, chamber 12, conduit 18, to the lower side of the piston 49 to move the movable contact toward open circuit position. The breaker is opened and near the end of the opening movement the arm 68 engages the upper arm 69 of the limit switch to interrupt the circuit at contacts 70. As soon as contacts 70 are opened coil 27 is deenergized and valve 19 is closed by the biasing spring 21. To close the breaker the manual closing switch 63 is closed to complete a circuit from the supply line 56 through the normally closed contact 58 of the overload device 57, the operating coil 35 of the diverter valve 30, the fixed contacts 71, which are closed by bridging contact 67 in the open circuit position of the circuit breaker to the supply line 55. Immediately upon movement of the diverter valve to its uppermost position, the bridging contact 43 is moved into engagement with the fixed contacts 44 and 45 to complete a circuit from the line 56 through the operating coil 27 of the main valve 19 so that the source of fluid under pressure is admitted to passage 13 and from there through conduit 17 to the upper side of the piston 49. As the circuit breaker is moved to its closed position, contacts 71 are opened to interrupt the energizing circuit of coil 35 so that the valve 30 is returned to the position indicated in Fig. 2. As soon as valve 30 moves downwardly the circuit of coil 27 is opened at contacts 44 and 45 and valve 19 closes. Suitable sealing contacts may be provided if desired to insure completion of the opening and closing operations of the breaker even though the manual switches 62 and 63 are only momentarily closed by the operator. The switches 62 and 63 provide for manual operation of the breaker by remote control. If desired, direct manual operation of the valves may be provided for by proportioning the cores 26 and 34 of the operating solenoids, so that they project below the closure plate 29 of the valve body 10 as illustrated in Fig. 1.

When the circuit breaker is in closed position and an overload occurs of sufficient magnitude to operate the overload relay 57, the circuit through the operating coil 27 of the main valve 19 is energized through a circuit including the contact 59 of the overload relay and the conductor 72. Opening of valve 19 admits fluid to the opening side of piston 49 through passage 13, diverter valve chamber 12 and conduit 18.

If, during the closing operation of the breaker 50 the operating solenoid 60 of the relay 57 is energized in response to an abnormal condition of line 54, the normally closed contact 58 is opened and the normally open contact 59 is closed. These circuit changes result in the deenergization of the diverter valve operating coil 35 so that the diverter valve is immediately returned to the position shown in Fig. 2 under the influence of the biasing spring 37. The main valve 19, however, is maintained open since coil 27 remains energized through a circuit including the contact 59 and fluid under pressure continues to flow to the diverter valve chamber 12. Since the diverter valve 30 has returned to its lowermost position fluid is supplied to the cylinder 48 on the opening side of piston 49 through conduit 18 while the opposite end of the cylinder is immediately vented to the atmosphere through conduit 17 and passage 39. Thus it is seen that the present invention provides a very effective trip-free arrangement for fluid-operated circuit breakers since the only change required in reversing the direction of the operating piston from closing movement to opening movement is the reversal of the relatively light diverter valve 30 which is balanced as far as pressure is concerned.

In Fig. 3 we have illustrated a modification embodying our invention in which the main valve is biased to open position and the operating coil of the main valve is normally energized to maintain the valve in closed position. In this figure the same numerals as those used in Fig. 2 have been used to designate corresponding parts. In order to avoid confusion in the description of the operation of the arrangement in Fig. 3, certain of the numerals have been primed where the parts operate in a slightly different manner from that of the corresponding part in Fig. 2. In the arrangement shown in Fig. 3 the main valve 19' is normally biased to open position by a biasing spring 21' and held closed by the operating coil 27' of the solenoid 28. The contacts 44 and 45 and the bridging contact 43' which are controlled in accordance with the position of the diverter valve 30 are closed when the diverter valve is in its lowermost position. The overload device 57 is provided with two normally closed contacts 58 and 59'. The limit switch 64 is provided with two sets of fixed contacts 70' and 71, both of which are opened when the circuit breaker is in closed circuit position, and the manual opening switch 62' is normally closed, whereas the opening switch 62 of Fig. 2 is normally open.

In the modification just described the circuit for energizing the coil 35 of the diverter valve from the supply lines 55 and 56 is completed through a circuit which includes in series, the fixed contacts 71 of the limit switch 64, the normally closed contact 58 of the overload device 57 and the manually operable closing switch 63, in exactly the same manner as that previously described in connection with Fig. 2. The circuit of the coil 27' for actuating the main valve 19' is completed from the supply line 55 through the normally closed contact 59' of the overload device 57, the normally closed contact 43' controlled by the position of the diverter valve and finally to the supply line 56 through a pair of parallel circuits, one of which includes a manually operable opening switch 62' and the other of which includes the fixed contacts 70' of the limit switch 64.

In the operation of the modification of Fig. 3, the operating coil 27' of the main valve 19' is normally energized to prevent the flow of fluid from the supply pipe 14 to the diverter valve chamber 12. To open the breaker 50 it is simply necessary to press the opening switch 62' which deenergizes the coil 27' and permits the main valve to open under the influence of the biasing spring 21' and the pressure of the fluid supply. The fluid then passes through passage 13, diverter valve chamber 12 and conduit 18 to the lower side of the piston 49 to actuate the circuit breaker to open circuit position. To close the breaker the closing switch 63 is closed to energize the coil 35 of the diverter valve 30 in the same manner as previously described in connection with Fig. 2. In order to open the main valve 19 in response to the movement of the diverter valve to its uppermost position, it is necessary to deenergize the operating coil 27' and in order to accomplish this, the circuit of operating coil 27' is opened by moving the bridging contact 43' from the fixed contacts 44 and 45. When the circuit breaker is closed, operation of the overload relay 57 opens the contact 59' in the circuit of the operating coil 27' to permit the valve 19' to open under the influence of spring 21' and supply fluid under pressure to the opening side of the operating piston 49.

Trip-free operation of the modification of Fig. 3 is substantially the same as that described in connection with the modification of Fig. 2. Operation of the overload device 57 during closing operation of the breaker opens contacts 58 and 59' to deenergize the operating coil 35 of the diverter valve and to maintain the energizing circuit of the coil 27' of the main valve 19 open after the bridging contact 43' has returned to engagement with the fixed contacts 44 and 45 in response to the movement of diverter valve 30 to its lowermost position. As a result main valve 19' is open and diverter valve is in the position shown in Fig. 3 so that operating fluid is supplied through conduit 18 to cylinder 48 on the opening side of piston 49.

It is apparent from an inspection of the drawing that with the arrangement of Fig. 3 a failure of the control potential will cause the breaker to open automatically.

While we have shown and described particular embodiments of our invention, it will be apparent to those skilled in the art that many modifications may be made and we intend in the appended claims to cover all modifications within the spirit and scope of our invention.

What we claim as new and desire to secure by Letters Patent of the United States, is:

1. A control system for fluid-operated electric circuit breakers including a breaker-operating piston, comprising a source of fluid pressure, a pair of conduits for supplying fluid pressure to opposite sides of the piston, a main valve for controlling the flow of fluid from said supply, a diverter valve for directing selectively the fluid passed by said main valve to one of said conduits to move said piston in one direction, means for operating said valves, and means responsive to movement of said diverter valve for effecting the operation of said main valve.

2. A control system for a fluid pressure operated piston comprising, a supply of fluid under pressure, a pair of conduits for supplying fluid under pressure to the opposite sides of the piston, a main valve for controlling the flow of fluid from said supply, a diverter valve for directing selectively the fluid passed by said main valve to either of said conduits to move said piston in either direction, means for operating said valves, and means responsive to movement of said diverter valve for controlling the operation of the operating means of said main valve.

3. A control system for fluid-operated electric circuit breakers including a breaker-operating piston comprising a source of fluid pressure, means defining a pair of passages for supplying fluid pressure to the opposite sides of the piston to move said breaker to open and closed positions, a main valve for controlling the flow of fluid from said supply normally biased to one operative position, a relatively light easily shiftable diverter valve for directing selectively the fluid passed by said main valve to one of said conduits to move said piston in one direction, electromagnetic means for operating said valves, and switching means operable to control the operation of the electromagnetic operating means of said main valve in accordance with the operative position of said diverter valve.

4. A control system for fluid-operated electric circuit breakers including an operating piston, comprising a source of fluid pressure, means defining a pair of passages for conducting fluid to the opposite sides of said piston to move said breaker to open and closed positions, means including a main valve and a diverter valve connected in series relation in the fluid circuit from said source to said passages for controlling the operation of said breaker, said main valve being normally biased to one operative position and said diverter valve being normally biased to a position to direct fluid under pressure to the opening side of said piston, a source of control potential, electromagnetic means for operating each of said valves, manually operable switching means for controlling the energization of the electromagnetic operating means of said main valve to initiate opening movement of said breaker, manually operable switching means for energizing the electromagnetic operating means of said diverter valve to move said diverter valve to a position to admit fluid under pressure to the closing side of said piston, and means responsive to the movement of said diverter valve for controlling the energization of the operating solenoid of said main valve.

5. A control system for fluid-operated electric circuit breakers including an operating piston, comprising a source of fluid pressure, means defining a pair of passages for conducting fluid to the opposite sides of said piston to move said breaker to open and closed positions, means including a main valve and a diverter valve connected in series relation in the fluid circuit from said source to said passages for controlling the operation of said breaker, said main valve being normally biased to one operative position and said diverter valve being normally biased to a position to direct fluid under pressure to the opening side of said piston, a source of control potential, electromagnetic means for operating each of said valves, manually operable switching means for controlling the energization of the electromagnetic operating means of said main valve to initiate opening movement of said breaker, manually operable switching means for energizing the electromagnetic operating means of said diverter valve to move said diverter valve to a position to admit fluid under pressure to the closing side of said piston, and switching means operable to control the energization of the operating solenoid of said main valve in accordance with the energization of the operating solenoid of said diverter valve.

6. A control system for fluid-operated electric circuit breakers including a breaker-operating piston comprising a source of fluid pressure, a pair of passages connected to said source for supplying fluid to opposite sides of said piston to move said breaker to open and closed positions, a first valve for controlling the flow of fluid from said source, a second valve for directing selectively fluid passed by said main valve to one of said passages, each of said valves being normally biased to one position, electromagnetic means for operating each of said valves to another operative position, a control circuit for controlling the energization of said electromagnetic operating means including a source of control potential and a device responsive to a condition of the circuit controlled by said breaker, the operation of said device during closing movement of said breaker being effective to alter the connections of said control circuit to reverse the position of said second valve and to maintain said first valve in open position.

7. A control system for fluid-operated electric circuit breakers including a breaker operating piston, comprising a source of fluid pressure, means defining a pair of passages connecting said source with the opposite sides of said piston for supplying fluid to move said breaker to open and closed positions, a first valve for controlling the flow of fluid from said source, a second valve for directing selectively fluid passed by said main valve to one of said passages, means for biasing each of said valves to one operative position, means for operating each of said valves to another operative position, a control device responsive to a condition of the circuit controlled by said breaker, and means responsive to the operation of said device during closing operation of said breaker for controlling the operating means of said second valve to reverse the position thereof and to maintain said first valve in open position.

8. A control system for fluid-operated electric circuit breakers including a breaker operating piston, comprising a source of fluid pressure, means defining a pair of passages connecting said source with the opposite sides of said piston for supplying fluid to move said breaker to open and closed position, a first valve for controlling the flow of fluid from said source, a second valve for directing selectively fluid passed by said main valve to one of said passages, means for biasing said first valve to one operative position, means biasing said second valve to a position to direct fluid to the opening side of said piston, means for operating each of said valves against said biasing means, a control device responsive to a condition of the circuit controlled by said breaker, and means responsive to the operation of said device for maintaining said first valve in open position and for preventing operation of the operating means of said second valve.

9. A control system for fluid-operated electric circuit breakers including a breaker-operating piston, comprising a source of fluid pressure, means defining a pair of passages for supplying fluid to opposite sides of said piston to move said breaker to open and closed positions, a first valve for controlling the flow of fluid from said source, a second valve for directing selectively fluid passed by said main valve to one of said passages, each of said valves being normally biased to one position, electro-magnetic means for operating each of said valves to another operative position, a control circuit for controlling the energization of said electromagnetic operating means including a source of control potential, a device responsive to a condition of the circuit controlled by said breaker, a manual opening switch and a manual closing switch, said manual closing switch being effective to complete a circuit through the electromagnetic operating means of said second valve to direct fluid from said source to the closing side of said piston, means responsive to movement of said second valve for energizing the electromagnetic operating means of said first valve, and means responsive to the operation of said device for rendering said closing switch ineffective to energize the electromagnetic operating means of said second valve and for shunting said manual opening switch to maintain the operating means of said first valve energized.

10. A control system for fluid-operated electric circuit breakers including a breaker-operating piston comprising a source of fluid pressure, a pair of passages connected to said source for supplying fluid to opposite sides of said piston to move said breaker to open and closed positions, a first valve for controlling the flow of fluid from said source, a second valve for directing selectively fluid passed by said main valve to one of said passages, each of said valves being normally biased to one position, electromagnetic means for operating each of said valves to another operative position, a control circuit for controlling the energization of said electromagnetic operating means including a source of control potential and a device responsive to a condition of the circuit controlled by said breaker, the operation of said device being effective to complete a circuit through the electromagnetic operating means of said main valve and to prevent the energization of the electromagnetic operating means of said second valve.

11. A control system for fluid-operated electric circuit breakers including an operating piston comprising a source of fluid under pressure, means defining a pair of passages for conducting fluid to the opposite sides of said piston, and means including a main valve and a diverter valve in series relation in the fluid circuit connecting said source with said passages, electromagnetic means normally energized to hold said main valve closed, means for biasing said diverter valve to a position to admit fluid to the opening side of said piston, electromagnetic means for operating said diverter valve to another position to admit fluid to the closing side of said piston, means responsive to abnormal conditions in the circuit controlled by said breaker for controlling the energization of the electromagnetic operating means of both said valves, and means responsive to movement of said diverter valve to a position to close said breaker for deenergizing the operating winding of said main valve.

12. A control system having a fluid-operated electric circuit breaker including an operating piston comprising a source of fluid pressure, a main valve for controlling the flow of fluid from said source, a diverter valve assembly for directing selectively the fluid passed by said main valves to opposite sides of said piston, said diverter valve assembly comprising a valve body having an elongated chamber, a valve member including spaced mechanically connected piston members slidably mounted in said chambered body, a first conduit connected with the outlet side of said main valve and communicating at one end with a central portion of said elongated chamber, a pair of conduits communicating at one end with said chamber near the opposite ends thereof and at the other end with the atmosphere, a second pair of conduits each communicating at one end with said chamber at a point between said first conduit and one of said first pair of conduits and at the other end with the opposite sides of said operating piston, the spacing of said diverter piston members and the chamber ends of said conduits being such as to connect said first conduit to one of said second pair of conduits and the other of said second pair of conduits to one of said first pair of conduits in either extreme position of said diverter valve.

13. A control system for fluid-operated electric circuit breakers including a breaker operating piston comprising a source of fluid pressure, valve means for controlling the application of fluid from said source to the opposite sides of said piston to move said breaker to open and closed positions, actuating means for moving said valve to a position to direct fluid to one side of said piston to move said breaker to closed position, manual means for controlling said actuating means, and means responsive to an abnormal condition of an electric circuit controlled by said breaker for causing said valve means to move to a position to direct fluid to the opening side of said piston independently of the operative position of said manual means.

14. A control system for fluid-operated electric circuit breakers including a breaker operating piston comprising a source of fluid pressure, valve means for controlling the actuation of said operating piston by fluid from said source to move said breaker to open and closed positions, actuating means for moving said valve means to either of two positions to direct fluid to the opposite sides of said piston, manual means for controlling said actuating means to move said valve means to a position to direct fluid to the closing side of said piston, and means responsive to an abnormal condition of an electric circuit controlled by said breaker for rendering said actuating means effective to move said valve means to a position to direct fluid to the opening side of said operating piston independently of the operative position of said manual means.

15. In a control system for a fluid-operated electric circuit breaker, a fluid motor for operating said circuit breaker, a source of fluid under pressure for operating said motor, valve means for controlling the application of fluid from said source to said fluid motor to move said circuit breaker to open and closed positions, said valve means comprising a main valve and diverter valve serially connected between said source and said fluid motor, actuating means for moving said diverter valve to either of two positions selectively to control the operation of said fluid motor when said main valve is open, and means responsive to an abnormal condition of an electric circuit controlled by said circuit breaker for rendering said actuating means effective to cause said fluid motor to open said circuit breaker when said circuit breaker is in the process of being closed without requiring any further operation of said main valve, whereby trip-free operation of said circuit breaker is obtained.

16. In a control system for a fluid-operated electric circuit breaker, a fluid motor for operating said circuit breaker, a source of fluid under pressure for operating said motor, means including a main valve and serially connected diverter valve interconnecting said source and said fluid motor, means for selectively operating said diverter valve to determine the operation of said fluid motor when said main valve is open, said valves being so constructed and arranged that only said diverter valve need be operated after said main valve is opened during a circuit-closing operation, whereby trip-free operation of said circuit breaker is obtained.

PERCY BARTLETT.
LEONARD S. SUBBER.